March 2, 1965 L. E. SCAGGS 3,171,973
SOLID-STATE SEMICONDUCTOR DEVICE FOR DEFLECTING A CURRENT TO
DIFFERENT CONDUCTION ZONES WITHIN DEVICE FOR COUNTING
Filed Jan. 9, 1961

INVENTOR.
LEE E. SCAGGS
BY
ATTORNEY

United States Patent Office 3,171,973

Patented Mar. 2, 1965

3,171,973

SOLID-STATE SEMICONDUCTOR DEVICE FOR DEFLECTING A CURRENT TO DIFFERENT CONDUCTION ZONES WITHIN DEVICE FOR COUNTING

Lee E. Scaggs, San Jose, Calif., assignor to Varian Associates, Palo Alto, Calif., a corporation of California Filed Jan. 9, 1961, Ser. No. 81,456
5 Claims. (Cl. 307—88.5)

This invention relates to electric deflection devices capable of signal gating, current switching, or counting.

Heretofore, electric deflection devices which were capable of gating a signal to a given current path or switching a current to a different circuit as encountered, in a counting device included an electron tube, either vacuum or gas, in which a cathode ray was deflected. In other applications a plurality of "solid state" semiconductor devices were substituted for the vacuum or gas tube so that a current can be switched from one semiconductor device to another.

A principal object of this invention is to provide a "solid state" semiconductor unit which deflects a current from one conduction zone to another within the unit.

One feature of the present invention is the provision of a novel semiconductor unit in place of an electron tube in a deflection device.

Another feature of the present invention is the provision of one novel semiconductor in place of a plurality of semiconductors in a deflection device.

Another feature of the present invention is to provide an improved deflection device which is small, economical, and fast operating.

Another feature of the present invention is to provide an improved semiconductor unit.

Still another feature of the present invention is to provide a decade counter of semiconductive material.

These and other features of advantage of the present invention will become more apparent upon a perusal of the following specification taken in connection with the drawings, wherein.

When voltage is applied between two points across a high resistance material, the well-known voltage gradient is formed between the two points. If the high resistance material is in the form of a bar of uniform cross-section and uniform resistivity, the voltage gradient will be uniform.

Figure 1:
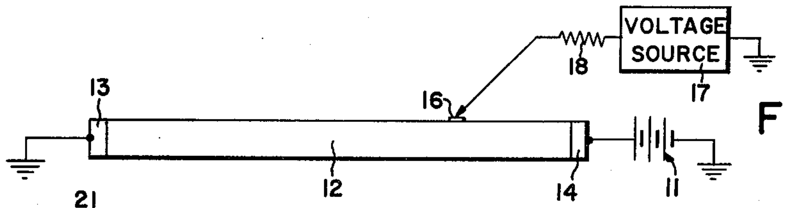
FIG. 1 is a schematic representation explaining a phenomenon which occurs in a double based diode semiconductor device.

Referring to FIG. 1, a voltage source 11 applies a potential difference (V) between the ends of a member 12 which has a uniform cross-section between its ends. The member 12 is made of a semiconductive material which is either of the N-type, which contains an excess of electrons (therefore negative), or of the P-type, which contains an excess of holes (therefore positive). Both N- and P-types of semiconductive materials are well known in the art and hereinafter when the term "semiconductor" is used, it shall refer to either the N-type or the P-type material. Since member 12 is a semiconductor, bases 13 and 14 disposed one at each end are ohmic in order to make non-rectifying connection between the source 11 and the member 12.

The potential difference (V) across the ends of the member 12 forms a voltage gradient along the member because the member in this case acts as a simple resistor. At a predetermined point between the bases, 13 and 14, an emitter or junction 16 is placed on the bar by any one of the standard methods such as alloying, diffusion, or deposition. The emitter 16 is made of the opposite type of semiconductor material than the member 12 to form a P–N or N–P junction between the two. (For clarity, the embodiments of the invention to be described will have the member 12 made of an N-type material and therefore the emitters or junctions will be made of a P-type material, and base 13 is grounded and biased negative with respect to base 14.)

Figures 3, 4, 5:
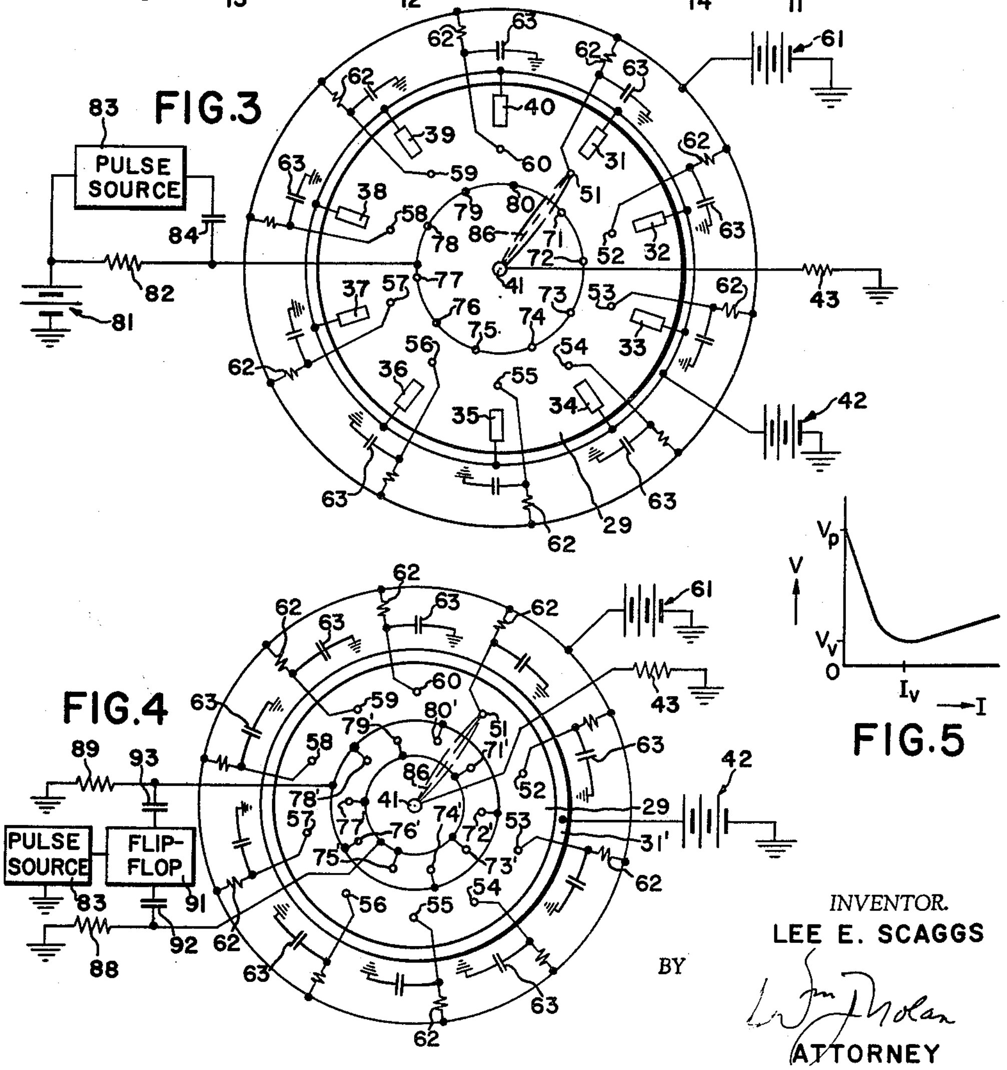
FIG. 3 is a schematic representation of a novel semiconductor unit as used in a decade counter.
FIG. 4 is a schematic representation of another embodiment of a semiconductor unit for a decade counter.
FIG. 5 is a graphical representation of the resistance of the device with respect to both current through and voltage difference across the device.

Since the voltage gradient in member 12 is uniform, the voltage in the member 12 between the emitter 16 and one of the bases is proportional to the total voltage V as the distance from the emitter 16 to the said one of the bases is proportional to the distance between bases 13 and 14. This ratio shall hereinafter be referred to as $\nu$. The voltage at the emitter 16 relative to said one base is then $\nu V$. If a voltage supply 17 supplies a voltage which is negative with respect to $\nu V$ to the emitter 16, the emitter will be "back biased" and only leakage curent will flow. If supply 17 applies a voltage which is positive with respect to $\nu V$ to the emitter 16, the emitter 16 being P-type will inject holes into the N-type member 12. The conductivity of the region between base 13 and emitter 16 is thus increased and the device exhibits a negative resistance, until the voltage drops to a minimum value ($V_v$, FIG. 5) and then the device exhibits positive resistance. Hereinafter the voltage at which this action (negative resistance) starts shall be known as the peak voltage ($V_p$ which is equal to $\nu V$) and the point at which the action ceases shall be defined by valley voltage and valley current ($V_vI_v$). These are illustrated in FIG. 5 wherein voltage is the ordinate and current is the abscissa. If a resistor 18 between supply 17 and emitter 16 is of a high enough value the supply current will be below valley current and the member will conduct intermittently.

Figure 2:
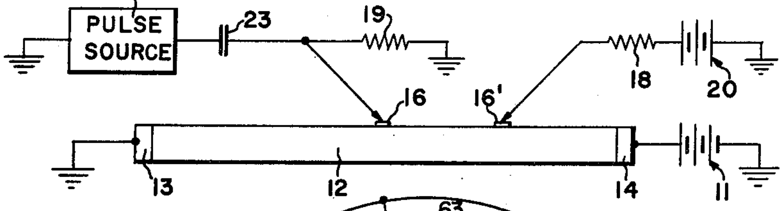
FIG. 2 is a schematic representation of a double emitter, double base device in which the first emitter is used to start current through the device and the second emitter is used to hold the current on in the device.

Referring to FIG. 2 two emitters 16 and 16' are formed on the member 12. The principle is useful to make for example a switch which can be rapidly switched on with a low pulse. For clarity of explanation, absolute values will be given to the various distance and voltage sources, emitter 16 is so spaced as to have its $\nu$ equal to .5 and emitter 16' is so spaced as to have its $\nu$ equal to .75. Assuming that voltage V of source 11 is 50 volts and base 14 is positive with respect to base 13 which is grounded, emitter 16 will have a peak voltage ($V_p$) of plus 25 volts ($\nu V$), but is held to ground potential through a resistor 19.

A voltage source 20 biases the emitter 16' to plus 36 volts through the resistor 18. Emitter 16' is "back biased" since its peak voltage is plus 37.5 v. ($\nu V$ for emitter 16'). Since both emitters are back biased the device is in its low conduction state; that is, high resistance.

When emitter 16 is biased with a pulse voltage having a peak value of more than plus 25 v. ($\nu V$ for emitter 16) with respect to ground, by the pulse source 21 through a capacitor 23, the member 12 will then conduct between base 13 and emitter 16. As in FIG. 1 the voltage drop between these two points passes through a negative resistance region to its valley point. Thus the voltage at emitter 16 becomes, assuming a value, 2 v. above ground. Thus, the voltage difference between emitter 16 and the second base 14 now has a value of 48 volts. By regarding emitted 16 as a base, emitter 16' has now an $\nu$ of .5 thereby making the peak voltage at emitter 16', 26 volts above ground (2 v.+.5×48 v.). Since source 20 maintains 36 v. above ground, the member 12 becomes conducting between base 13 and emitter 16′. The member continues to conduct even after the pulse subsides at emitter 16, if the resistor 18 is of low enough value to supply current above valley current ($I_V$). Of course if member 12 is made of P-type material and emitter 16 and 16′ are made of N-type material, base 14 would be negative with respect to base 13 and ground and the voltage at which the emitters will function as described will be negative with respect to base 13, for example the peak voltage for emitter 16 will be 25 volts below the potential of base 13.

The principle is also useful as a deflection device or a counting device. Referring to FIG. 3, a decade counter is shown, but more or fewer than ten units can be integrated into the counter without departing from the invention. The counting device comprises a disk-shaped member 29 made of semiconductive material similar to member 12. Ten ohmic bases 31 to 40 are disposed evenly around the disk and equally spaced from an ohmic base 41 disposed at the center of the disk 29. Base 41 is technically similar to base 13 and bases 31 to 40 are technically similar to base 14, as shall be explained.

The disk shaped member 29 is also preferably made of the N-type semiconductive material, although it can be made of the P-type. But one understands that the polarity of the device must be reverse as mentioned with FIG. 2. A common voltage source 42 biases the bases 31 to 40 positive with respect to base 41 since member 29 is of the N-type, which base 41 is grounded through a resistor 43.

Directly on a radial path between base 41 and each of the bases 31 to 40 and spaced an equal distance from base 41 are a set of ten emitters 51 to 60 of P-type material making a P–N junction between each emitter and the disk 29. These emitters 51 to 60 are biased positive with respect to ground by a common voltage source 61. A resistor 62 is connected between each emitter 51 to 60 and source 61, and a capacitor 63 is connected between each of the emitters 51 to 60 and ground. On disk 29 is also a second set of ten emitters 71 to 80 of P-type material making a P–N junction between each of these emitters and the disk, these junctions being evenly spaced around the disk 29 at an equal distance from base 41 which distance is less than the distance between emitters 51 to 60 and base 41. Each of the second set emitters 71 to 80 is disposed closer to one of the emitters 51 to 60 than the others but they are not in the direct radial path between bases 31 to 40 and base 41. In other words, the angle formed by emitter 51-base 41-emitter 71 is smaller than the angle formed by emitter 71-base 41-emitter 52. Each of the emitters 71 to 80 are connected together and biased positive with respect to ground by a common voltage source 81 through a resistor 82. A pulse source 83 in series with a capacitor 84 are both parallel-connected with resistor 82 between source 81 and these emitters 71 to 80.

Voltage source 42, like source 11, forms a relatively symmetrical voltage gradient between the center of the disk and its periphery, and source 61, like source 20, biases emitters 51–60 to a voltage less than the peak voltages of the emitters due to their position in the gradient electric field in order that the device may operate as a counting device. One of the ten units formed by the base 41 and each of the emitters 51 to 60 is made conducting through a conducting zone 86 enclosed by dotted lines between emitter 51 and base-one 41. This is commonly done by pressing a reset switch (not shown) which supplies a potential to emitter 51 which potential is above peak voltage for the emitter 51 in any phase of operation of the device. When zone 86 is conducting, the voltage gradient in the disk 29 is no longer uniform since the potential of emitter 51 is almost at ground potential and much less than the potential of the remaining emitters 52–60 thereby decreasing the ratio $\nu$ for each of these emitters than when no zone is conducting, but $\nu$ is not the same for all the first set of emitters 52 to 60, $\nu$ will be lowest in the emitters 52 and 60 which are closest to emitter 51. Therefore, the bias voltage of the emitters 52–60 must be lower than $\nu V$ of either emitter 52 or 60. Of course, the peak voltage of emitter 71 is much smaller than the peak voltage of either emitter 52 or 60 since $\nu$ of emitter 71 is smaller.

When the second set of emitters 71 to 80 is biased by the pulse source 83 with a pulse of maximum voltage which is more than $\nu V$ for emitter 71 but less than $\nu V$ for the remaining emitters in this set, the conducting channel 86 expands to include only emitter 71. This causes a further distortion of the voltage gradient in the disk, so that the ratio $\nu$ of emitter 52 is less than before the pulse was applied, and the voltage at which emitter 52 is biased in now greater than the new value $\nu V$. Thus the unit between emitter 52 and connector 41 is made conducting. Now two zones are attempting to conduct. But, to make a current deflection device or a counter, the unit which was conducting first must cease to conduct when the second unit conducts current. With two units attempting to conduct, the current in resistance 43 tends to double, tending to double the voltage thereacross. This decreases the total voltage across the emitter 51 and base 41, since emitter 51 is also connected to ground through the capacitor 63, which does not allow an instantaneous voltage change between emitter 51 and base 41. Thus the voltage between emitter 51 and base 41 decreases substantially to below valley voltage stopping the current from flowing therebetween. The capacitor 63 of emitter 52 further assist cut-off of zone 86 between base 41 and emitter 51 since the capacitor was fully charged and momentarily supplies a large current discharge at a large voltage through the new conducting zone. After capacitor 63 of emitter 52 discharges, the device has stabilized for the next pulse. When the next pulse is applied by the pulse source 83, the same phenomenon again occurs in the device and the conducting zone will be deflected this time between emitter 53 and base connector 41. Consequently, each time a pulse is triggered, the conducting zone will be deflected to the next position around the disk. The emitters 71 to 80 are biased about ground potential by source 81 instead of being biased at ground potential, as in FIG. 2, so that the peak voltage of pulse can be smaller than when the emitters are biased at ground potential.

FIG. 4 shows another embodiment of the deflection device or counting device. Elements which are numbered the same as in FIG. 3 serve the same function in FIG. 4 as in FIG. 3. The disk 29 of FIG. 4 has only one base 31′ for its second-base in the form of a ring around its periphery instead of the ten bases 31–40 of FIG. 3. The emitters 71′ to 80′ are so disposed on disk 29 to bisect the angle formed between two adjacent emitter of the first set of emitters 51 to 60 and the base 41. The numbered emitters 71′, 73′, 75′, 77′, and 79′, or every other one are grounded through a common resistor 88, and the even numbered emitters 72′, 74′, 76′, 78′, and 80′ or the remaining ones are grounded through a common resistor 89.

Like the embodiment of FIG. 3, when the zone 86 on the disc 29 of FIG. 4 is conducting the voltage gradient in the disc 29 is distorted so that when a pulse voltage is applied by the pulse source 83, a flip-flop circuit 91 channels the pulse through capacitor 92 to only the odd emitters 71′, 73′, 75′, 77′, and 79′. Only one of these emitters, emitter 71′ is in the lowest $\nu$ region. Then the conducting channel 86 expands to include emitter 71′ because the pulse voltage is more than the $\nu V$ at emitter 71′ and less than the $\nu V$ at the remaining odd numbered emitters 73′, 75′, 77′, and 79′. This causes a further distortion of the voltage gradient in the disk so that the ratio $\nu$ for emitter 52 is less than before the pulse was applied. The bias voltage of emitter 52 is greater than the new $\nu$V and thus a conducting channel is formed between emitter 52 and base 41. Then, the conducting zone 86 between emitter 51 and base connector 41 stops conducting current. When the next pulse voltage is triggered by source 83, the flip-flop circuit 91 channels the pulse through capacitor 93 to only the even numbered emitters 72', 74', 76', 78' and 80' but this time emitter 72' is at the lowest $\nu$ and the current is deflected to the unit between emitter 53 and base 41 for the same reasons described when the current changed from between emitter 51 and base connector 41 to between emitter 52 and base connector 41.

By switching the phase of the outputs of flip-flop circuit 91 pulse signals will cause the conducting path to advance counterclockwise thus allowing one to either add or subtract on the counter.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A semiconductor apparatus comprising a member made of one conducting type of semiconductive material, said member having a first base connector disposed on a portion of said member, said member having second base connector means disposed thereon and spaced from said first base connector, a first plurality of spaced discrete emitter portions made of semiconductive material having a conductivity opposite to that of said member and disposed on said member intermediate said first base connector and said second base connector means, a second plurality of spaced discrete emitter portions made of semiconductive material having a conductivity opposite to that of said member and disposed on said member intermediate said first base connector and said first plurality of spaced discrete emitter portions, said first base connector and said second base connector means being adapted and arranged to be biased at different potential such that a potential gradient can be formed within said member between said first base connector and said second base connector means, each of said first plurality of spaced discrete emitter portions being so arranged such as to lie at a different potential level within said potential gradient within said member than each of said second pluarlity of spaced discrete emitter portions when said member is in a nonconductive state, and each of said discrete emitter portions of said first plurality of spaced discrete emitter portions and said second plurality of spaced discrete emitter portions being geometrically oriented on said member such that the shortest line passing through any one of said emitter portions and terminating on said first base connector and said second base connector means will not intersect any other similar shortest line passing through any other emitter portion and terminating at said first base connector and said second base connector means.

2. The apparatus defined in claim 1 wherein said second base connector means includes a plurality of discrete spaced base connectors disposed on said member.

3. The apparatus defined in claim 1 wherein said second base connector means includes a single ring connector.

4. The apparatus as defined in claim 1 wherein each of said second plurality of spaced discrete emitter portions are connected in common to a voltage pulse source.

5. The apparatus as defined in claim 1 wherein each alternate emitter portion of said second plurality of spaced discrete emitter portions is connected in common and coupled to a voltage pulse source via a flip-flop circuit.

References Cited by the Examiner

UNITED STATES PATENTS

| | | | |
|---|---|---|---|
| 2,655,607 | 10/53 | Reeves | 307—88.5 |
| 2,832,898 | 4/58 | Camp | 307—88.5 |
| 2,863,056 | 12/58 | Pankove | 307—88.5 |
| 2,877,358 | 3/59 | Ross | 307—88.5 |
| 2,993,126 | 7/61 | Dorendorf | 307—88.5 |
| 3,114,050 | 12/63 | Dorendorf | 307—88.5 |

ARTHUR GAUSS, *Primary Examiner.*

GEORGE N. WESTBY, *Examiner.*